United States Patent [19]

Meuschke et al.

[11] Patent Number: 4,662,023
[45] Date of Patent: May 5, 1987

[54] ICE REMOVAL AUGER FOR ICE CONDENSER CONTAINMENT

[75] Inventors: Robert E. Meuschke, Penn Hills Twp.; Gregory E. Mazza, Bethel Park, both of Pa.

[73] Assignee: Westinghouse Electric Corp., Pittsburgh, Pa.

[21] Appl. No.: 731,830

[22] Filed: May 8, 1985

[51] Int. Cl.⁴ .................. B08B 9/04; E21B 9/00
[52] U.S. Cl. .................. 15/104.12; 175/325; 408/77; 408/83
[58] Field of Search .................. 175/18, 325; 408/77, 408/83; 15/104.09 R, 104.11, 104.12

[56] References Cited

U.S. PATENT DOCUMENTS

| | | | |
|---|---|---|---|
| 879,822 | 2/1908 | Karns | 175/325 |
| 1,717,986 | 6/1929 | Liebau | 15/104.12 |
| 3,729,057 | 4/1973 | Werner | 175/325 X |
| 4,418,437 | 12/1983 | French | 15/104.12 X |

FOREIGN PATENT DOCUMENTS 2275633  1/1976  France ................. 175/325
45846  6/1962  Poland ................. 15/104.12

Primary Examiner—Z. R. Bilinsky
Attorney, Agent, or Firm—Daniel C. Abeles

[57] ABSTRACT

An ice removal auger is lowered by a winch into a generally cylindrical ice containment structure from an open upper end of the structure and is controlled remotely from the exterior of the structure, for cutting and removing a body of ice therewithin. The auger comprises a power drive assembly mounted on a carriage for relative translational and nonrotational movement with respect thereto, the carriage including selectively operable engagement means which are remotely controlled from the exterior of the ice containment structure for engaging the interior cylindrical wall surface thereof to stabilize the power drive assembly against rotation relative to the ice containment structure, the power drive assembly including a motor connected through a shaft to a cutter at the lower end of the shaft which drives same in rotation, while the assembly moves axially downwardly in translation relative to the carriage for gradual and continuous cutting and removing of the body of ice.

11 Claims, 5 Drawing Figures

ICE REMOVAL AUGER FOR ICE CONDENSER CONTAINMENT

BACKGROUND OF THE INVENTION

1. Field of the Invention

This invention relates to ice condenser containments for condensing steam generated from the primary water of a nuclear reactor in the event of an accidental loss of coolant and, more particularly, to a method and apparatus for servicing such ice condenser containments to permit replacing ice which has sublimated and thus been lost from within the ice condenser container.

2. State of the Prior Art

Ice condenser containments are known for employment with nuclear reactors for condensing the steam from the primary water of the reactor in the event of an accidental loss of coolant. In a typical installation, there are provided approximately 2,000 ice baskets, each of which is approximately one foot in diameter and 50 feet in height and is filled with approximately 1,500 pounds of ice. The sidewalls of the ice basket are substantially cylindrical in configuration and are perforated to permit rapid exposure of the steam to the ice and thus to achieve corresponding, rapid condensation.

A problem has developed in the use of such ice condenser containments, in that due to sublimation of the ice, the initial volume and weight decreases with time and thus the lost ice must be replenished, or replaced. A minimum required amount of ice is typically at least 1,200 pounds for each ice basket, for assuring its effectiveness for counteracting the accidental loss of coolant, as above referenced. When the loss due to sublimation reduces the remaining amount of ice to below this minimum, serious safety hazards can be presented.

The structure of the ice baskets, however, has imposed serious obstacles to efficient and effective replenishing of the ice to meet the design standards. This can be more readily appreciated from the simplified schematic illustration of an ice basket 10 shown in FIG. 1. More particularly, FIG. 1 is an elevational cross-sectional view of an individual ice basket 10; as before noted, the ice basket 10 includes a sidewall 12 of generally cylindrical configuration, approximately 50 feet in height and approximately one foot in diameter. Cruciforms 14 are positioned at approximately six foot intervals along the axial height of the basket 10. The cruciforms 14 each comprise a number of metal straps, each approximately ⅛ inch thick and typically 1½ inches in height, which are integrally joined together at first ends along the axis of the cylindrical ice basket 10 and extend radially therefrom to engage the interior sidewalls of the basket 10, to which they are secured as by welding. Typically, each cruciform comprises four such radially extending straps in quadrature relationship and thus equiangularly displaced in 90° intervals, defining an "X"-shaped configuration. The cruciforms intially were provided to afford increased lateral support for the ice basket 10 as a precaution against severe seismic disturbances; however, it has been determined subsequently that such welded-in-place cruciforms are not necessary to maintaining adequate lateral support and that alternative structures, instead, may be employed.

The cruciforms, however, have imposed a substantial obstacle to replenishing the supply of ice, as the latter is depleted due to sublimation. For example, as seen in FIG. 1, the successively lower compartments contain inadequate charges of ice due to sublimation loss, and remain spaced apart due to the presence of cruciforms 14. Thus, while access may be had to the upper, open end of the ice basket 10 for recharging the first and possibly the second upper compartments, the lower compartments are inaccessible, imposing a serious obstacle to achieving the required replenishing of the charges of ice therein. Particularly, the replenishing of the ice charges has been both an arduous and time consuming task and very expensive, not only in performing the required ice recharging function, but also due to the resulting down time of the nuclear reactor and thus its loss of productive power generating time.

SUMMARY OF THE INVENTION

The present invention addresses the problem of servicing ice baskets in which the charges of ice have become depleted due to sublimation. Particularly, due to the closely adjacent stacking of the ice baskets 10 and the extremely large number thereof—for example, approximately 2,000 ice baskets are employed for a given nuclear reactor—access to the interior of the ice basket 10 is limited substantially to the upper, open end. As noted, it has been determined not to be necessary to employ cruciforms welded in place within the ice basket 10 and instead that alternative structures may be employed. Thus, while it is permissible to remove the cruciforms to gain access to the successively lower compartments, it is necessary first to remove the ice from each compartment, in succession, prior to removal of the cruciform associated with each such compartment. Thereafter, the required charge of ice may be replenished in reverse, successive order in the compartments of the ice basket; if desired, replaceable cruciforms or other structures may be substituted in place in the previous, welded-in-place cruciforms, in this ice recharging operation. The ice removal auger of the present invention permits rapid removal of the ice from each of the successive compartments, thereby to expose the associated cruciform and permit its ready removal. The present invention thus satisfies the requirement that the ice removal function be performed rapidly, to minimize the time and effort required in performing this necessary function and, as well, to minimize the associated down-time of the nuclear reactor.

DETAILED DESCRIPTION OF THE PREFERRED EMBODIMENT

Figure 1:
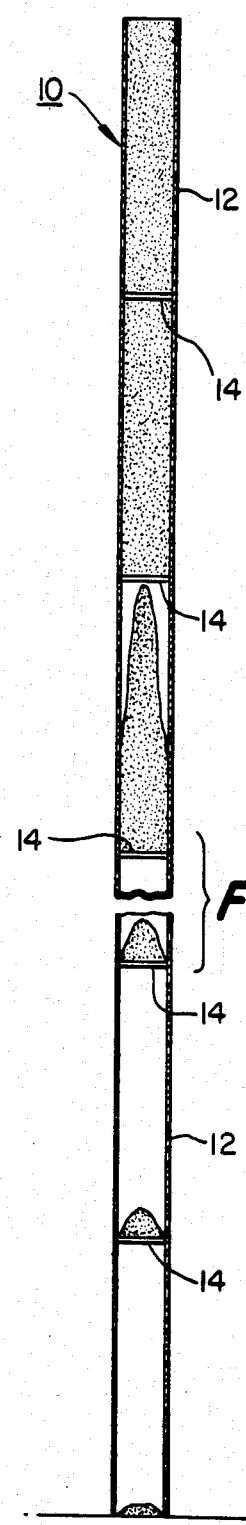
FIG. 1 is a schematic, elevational view of an ice basket of the type employed in the prior art.
Figure 2:
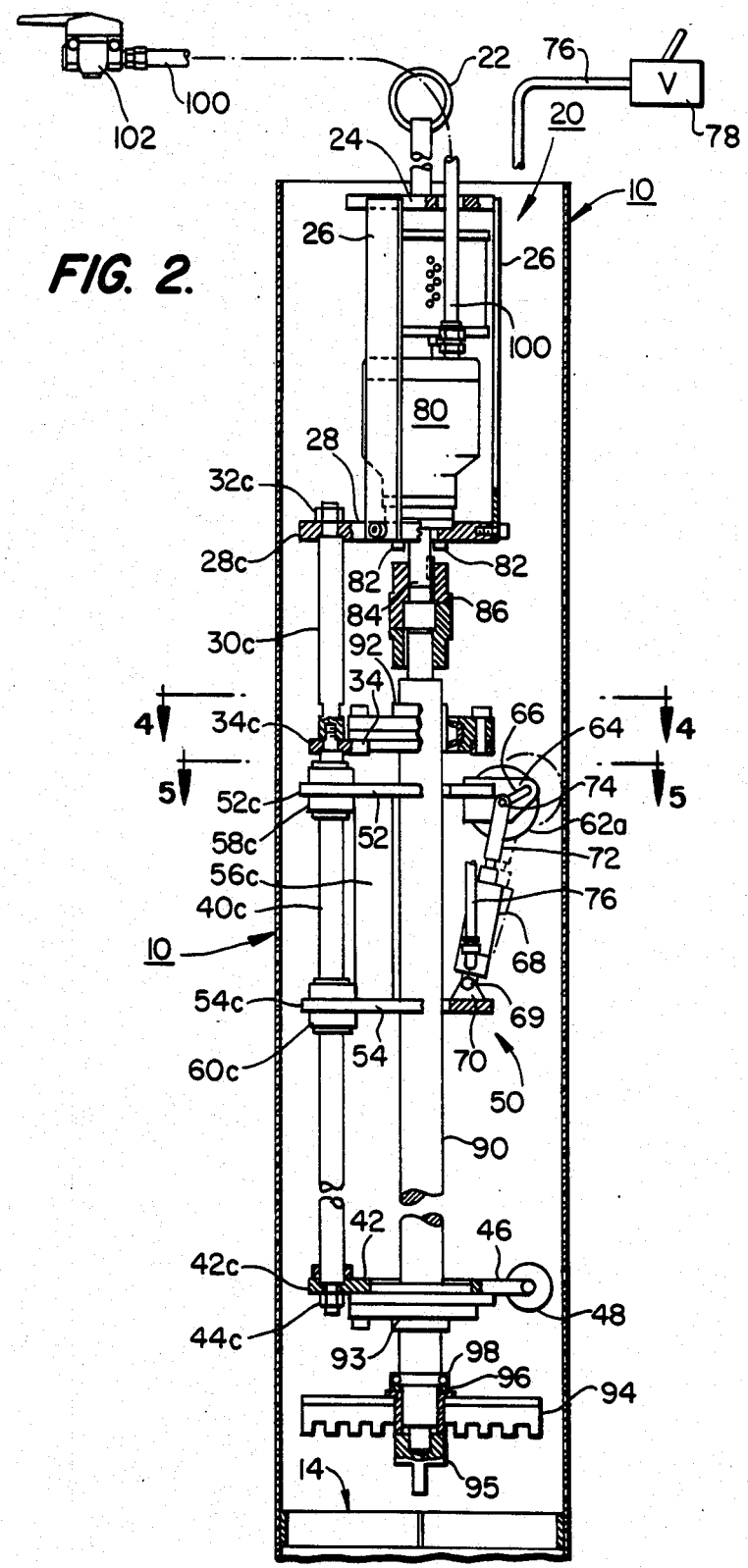
FIG. 2 is a front elevational view of an ice removal auger in accordance with the present invention.
Figure 3:
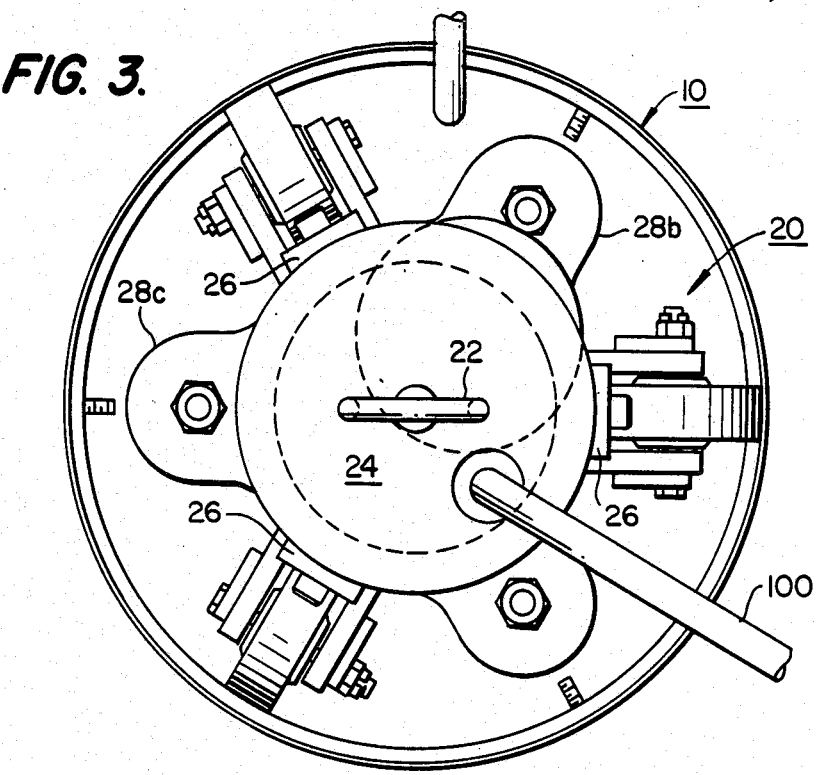
FIG. 3 is a top plan view of the ice removal auger of the invention.

With reference to FIG. 2, the ice removal auger of the invention, generally designated at 20, is preferably suspended by a ring 22 connected to a winch assembly (not shown) which permits the auger 20 to be raised above the upper, open end of an ice basket 10 and then gradually lowered coaxially into the ice basket 10. The ring assembly 22 is secured to a top plate 24 having depending support rails 26, of which three are provided, as best seen in FIG. 3, and which are secured at their lower ends to a mounting plate 28. The mounting plate 28, as best seen in FIG. 3, has radially extending flanges 28a, 28b, and 28c, to which there are secured three corresponding support shafts, as illustrated in FIG. 2 at 30c, each having a reduced diameter upper end which is received through a hole in its associated flange, as shown for flange 28c, and is threaded for receiving a nut 32c to secure same to the flange 28c. The lower ends of the support shafts 30a, 30b and 30c are internally threaded and positioned abutting corresponding apertures in a mounting plate 34, as seen in FIG. 2 for shaft 30c.

Figure 4:
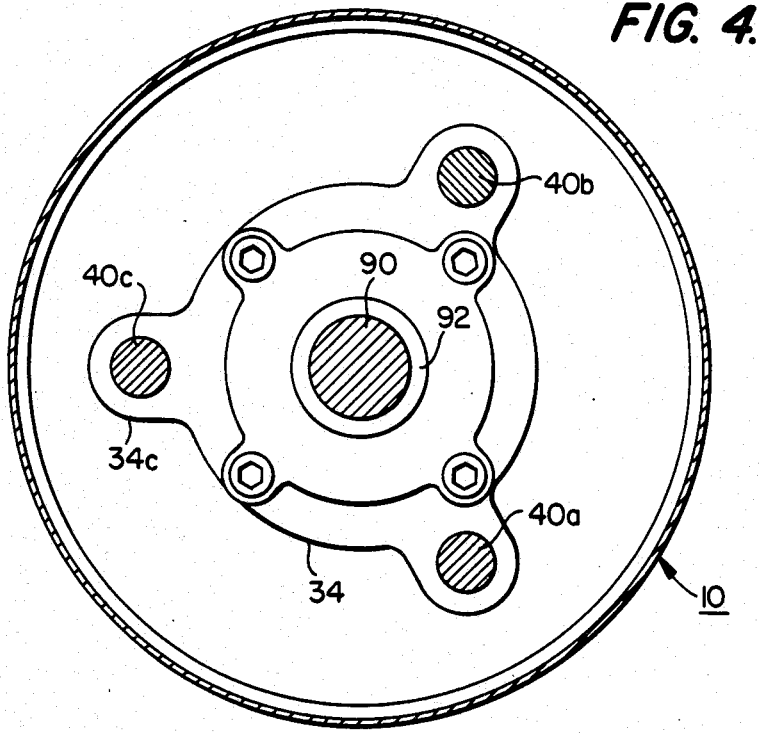
FIG. 4 is a cross-sectional view, taken along the lines 4—4 in FIG. 2, for illustrating internal structural features of the ice removal auger of the present invention.

A system of guide rails, preferably three in number and identified in the cross-sectional view of FIG. 4 at 40a, 40b and 40c, are secured to and extend from the support plate 34 in parallel axial relationship, each having reduced diameters and threaded shanks at each end. As seen in FIG. 2, the guide rail 40c extends through a corresponding aperture in the flange 34c of support plate 34 and is received in threaded engagement with the lower end of the support shaft 30c. The lowermost ends of the guide rails, as shown for guide rail 40c in FIG. 2, extend through corresponding apertures in a flange 42c of a support plate 42 and are secured thereto, as shown by the nut 44c for the guide rail 40c. Plate 42 carries radially extending brackets 46 on the outer extremities of which are mounted corresponding rollers 48, preferably again in a set of three, which serve to center and stabilize the support plate 42 within the ice basket 10.

Figure 5:
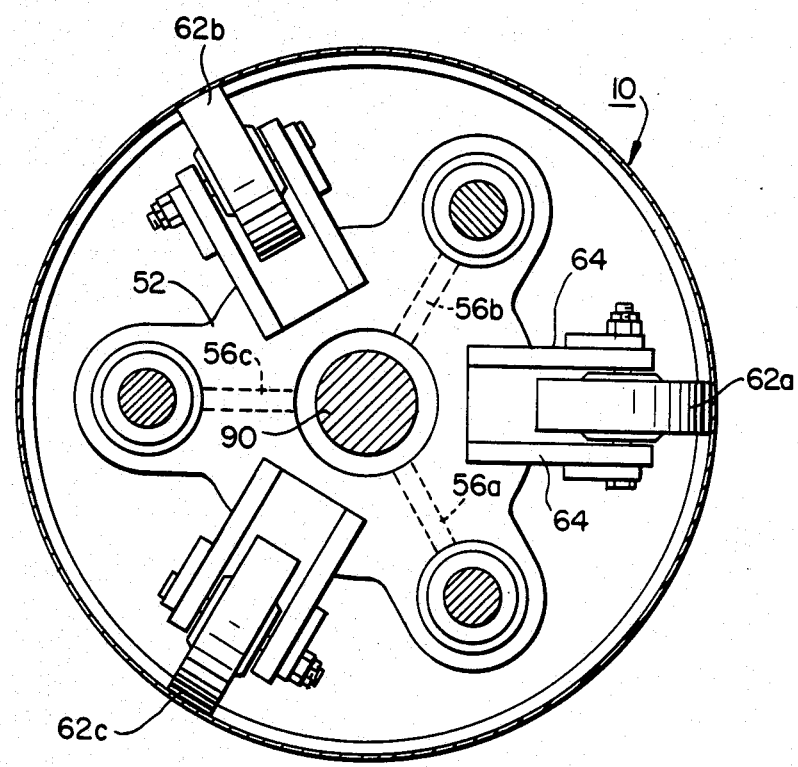
FIG. 5 is a cross-sectional view, taken along the line 5—5 in FIG. 2, for illustrating internal structural features of the ice removal auger of the present invention.

A carriage assembly 50 includes an upper mounting plate 52 and a lower mounting plate 54 rigidly secured together by longitudinally extending ribs 56a, 56b and 56c, shown in hidden view in FIG. 5, rib 56c being shown as well in FIG. 2. The upper and lower mounting plates 52 and 54 include corresponding flanges 52a, 52b and 52c and 54a, 54b and 54c within which are rigidly secured corresponding bearings 58c and 60c, to permit sliding relative movement thereof with respect to the corresponding guide rails, as seen particularly for guide rail 40c in FIG. 2.

The upper mounting plate 52 of the carriage assembly 50 carries a set of three remotely actuable rollers 62a, 62b and 62c as seen in FIG. 5, of which roller 62a is seen also in FIG. 2. Since the associated actuating structure relating to each of the rollers 62a, 62b and 62c is the same, reference will be had only to roller 62a. Specifically, a clevis 64 is secured to the upper mounting plate 52 and extends in parallel relationship radially outwardly therefrom. Mating, angled slots 66 are provided in the sidewalls of clevis 64 and receive in sliding engagement therethrough a mounting axle for the wheel 62, the mounting axle extending beyond the outer surfaces of the clevis 64.

An air cylinder assembly 68 is pivotally mounted at 69 to a corresponding bracket 70 secured to the lower mounting plate 54, the clevis 72 being received at its free end over the protruding ends of the axle of the wheel 62a and secured thereto by a suitable nut assembly 74. A pneumatic hose 76 is connected to the air cylinder 68 in conventional fashion and extends vertically upwardly along the auger 20 to a valve 78 connected in turn to a source of pressurized air. By operation of valve 78, the air cylinder 68 is actuated in conventional fashion to move the clevis 72 outwardly and thus to move the wheel 62 from its normal, retracted position shown in solid lines to the dotted line position shown in FIG. 2, engaging the interior surface of the wall 12 of ice basket 10.

An air driven motor 80 is secured to the central portion of support plate 28 by bolts 82, the motor shaft 84 extending downwardly from the plate 28 and being received in a coupling 86. A shaft 90 is mounted by appropriate bearings 92 and 93 in the support plates 34 and 42 for free rotary movement and at its upper, free end is received in the coupling 86. Suitable keys (not shown) secure the coupling 86 to the shaft 90 and the motor shaft 84 such that the shaft 90 is driven in rotation by the motor 80.

The lower end of the shaft 90 carries an ice cutter blade 94 and a cutter tip 95, the latter being internally threaded and screwed onto the threaded shank of the shaft 90, thereby to engage the blade 94 against a gasket 96 and a stop collar 98 which is rigidly secured to the shaft 90. The blade 94 is provided with a toothed configuration on its cutting edge, which has been found to contribute significantly to its effectiveness in performing the ice cutting operation.

The motor 80 preferably is air driven and thus an air supply hose 100 extends from the motor 80 to an external valve 102 which in turn is connected to, a supply of pressurized air for operating the motor 80.

In operation, the auger 20 is received within the ice basket 10 with the air cylinders 68 deactivated, the wheels 62a, 62b and 62c thus being in their normal, retracted positions, until the cutter blade 92 comes in contact with the surface of the ice. In this initial step, the carriage 50 is positioned closely adjacent the support plate 42 in what may be termed a retracted or withdrawn position of the power drive assembly of the motor 80, the drive shaft 90 and the cutter blade 94 and its associated tip 95, relative to the carriage 50. Once the blade 94 makes initial contact with the ice, the auger 20 is raised slightly, to space the blade 94 about one inch above the ice. While in that position the valve 78 is opened for actuating the air cylinders, such as 68, and displacing the wheels 62a, 62b and 62c outwardly into engagement with the interior walls of the ice basket 10. The carriage 50, in the actuated, wall-engaging position of its associated wheels 62a, 62b and 62c, both axially aligns the ice removal auger 20 within the ice basket 10 and maintains the auger 20 stable against rotation during the rotary actuation of the cutting blade 92. Valve 102 is then opened to operate the motor 80, thereby driving the cutter blade 92 in rotation. The winch (not shown) then is operated so as to lower the auger 20 through the required extent of its travel, relative to the carriage 50, the blade 20 cutting and crushing the ice as it advances downwardly and dispelling same through the perforated sidewalls of the ice basket 10.

In FIG. 2, the power drive assembly of the motor 80, shaft 90, and related components as above referenced, is in its fully extended position and thus at the end of its travel, relative to the carriage 50. The length of travel is primarily determined by the length of the rails 40a, 40b and 40c. A convenient length of travel has been found to be about 24 inches; thus the ice cutting operation may be performed in successive stages, if a depth of several feet of ice must be traversed. This is accomplished readily by operation of the valves 78 and 102, so as to stop the motor 80 and release the carriage 50 from the engaged position, whereupon it slides down the rails 40a, 40b, and 40c and comes to rest on the support plate 42, thus recreating the initial condition. The start-up sequence of operations as above described then is repeated. In some circumstances, the wheels 62a, 62b and 62c may also be free to rotate and thus extend the length of travel, permitting continuous operation.

In FIG. 2, a cruciform 104 is indicated by hidden lines, suggesting that removal of the ice supported on the cruciform 104 is substantially completed. When all of the ice in a given compartment is removed, the auger 20 is withdrawn from within the ice basket 10. The cruciform 104 thus is accessible for removal by any suitable technique. Thereafter, the auger 20 is again inserted into the ice basket 10, to enter into the next compartment, and the foregoing procedure is repeated, for each compartment in succession.

It will be readily appreciated by those of skill in the art that the ice removal auger of the present invention provides for expeditious and effective removal of ice from successive compartments of ice baskets, a task which heretofore has been arduous and time consuming to achieve. Numerous modifications and adaptations of the ice removal of the present invention will be apparent to those of skill in the art and thus it is intended by the appended claims to cover all such modifications and adaptations as fall within the true spirit and scope of the appended claims.

I claim as my invention:

1. An ice removal auger for removing ice from an elongated, generally cylindrical and vertically oriented ice containment structure, the interior of which is accessible from an upper, open end thereof, comprising:
   a carriage;
   a power drive assembly mounted on said carriage for relative translational and nonrotational movement with respect thereto and comprising upper and lower supports, an elongated shaft rotatably mounted adjacent its upper and lower ends in said upper and lower supports, respectively, and a motor mounted on said upper support and coupled to said shaft for driving same in rotation;
   a cutter secured to the lower end of said shaft for common rotation therewith;
   said auger being-adapted for being lowered into an ice containment structure from the upper, open end thereof, with said shaft of said power drive assembly substantially in alignment with the axis of said ice containment structure and with said carriage disposed adjacent said lower support and within said ice containment structure, to position said cutter adjacent the surface of a body of ice therein to be removed;
   said carriage including means selectively movable from a normal, retracted position, to an actuated position for engaging the interior sidewall of said ice containment structure to prevent relative rotation therebetween; and
   said power drive assembly being movable axially downwardly in translation relative to said carriage during rotation of said cutter for gradual and continuous cutting and removing of the body of ice, while being stabilized by said carriage against rotation relative to said ice containment structure.

2. An ice removal auger as recited in claim 1, further comprising:
   means connected to said engaging means of said carriage from the exterior of an ice containment structure into which said auger is lowered for remotely operating said engaging means between said retracted and said actuated positions thereof; and
   power supply means for said motor connected to said motor from the exterior of said ice containment structure for remotely operating said motor.

3. An ice removal auger as recited in claim 1, wherein said power drive assembly further comprises elongaged guide rails interconnecting said upper and lower supports and extending in parallel axial relationship with said drive shaft, said guide rails being received in sliding engagement on said carriage.

4. An ice removal auger as recited in claim 3, wherein:
   said carriage comprises upper and lower, generally parallel plates having corresponding central apertures therein for permitting said shaft to pass therethrough and having aligned, corresponding bearing mounts for receiving respective ones of said guide rails.

5. An ice removal auger as recited in claim 1, further comprising:
   rollers mounted on said lower support and extending radially toward the interior sidewall of said ice containment structure for maintaining said shaft in substantial axial alignment with the axis of said ice containment structure.

6. An ice removal auger as recited in claim 1, wherein said selectively operable engagement means of said carriage comprise wheels mounted on said carriage with the axis of each wheel perpendicular to the axis of said shaft and movable from a retracted position adjacent said shaft radially outwardly and away from said shaft to said actuated position.

7. An ice removal auger as recited in claim 6, further comprising:
   an actuator associated with each said wheel, each said actuator having a fixed end and an actuator end, one of said ends being connected to the movable axis of the associated said wheel and the other of said ends being connected to said carriage, each of said wheels being normally biased to its retracted position; and
   means for selectively and simultaneously activating all of said actuators for selectively and simultaneously moving all of said wheels from said retracted to said actuated positions thereof.

8. An ice removal auger as recited in claim, 7, wherein each said actuator comprises an air cylinder actuator and said activating means comprises means for selectively supplying pressurized air for activating said air cylinder actuators.

9. An ice removal auger as recited in claim 8, wherein said means for selectively supplying pressurized air comprises an air control valve for connection to a source of pressurized air and positioned exteriorly of said ice containment structure, and tubing extending from said air cylinder to said air control valve.

10. An ice removal auger as recited in claim 9, further comprising:
    power supply means for said motor connected to said motor from the exterior of said ice containment structure for remotely operating said motor.

11. An ice removal auger as recited in claim 10 wherein said motor is air-driven, and wherein said power supply means comprises a control valve for connection to a source of pressurized air and positioned exteriorly of said ice containment structure, and tubing extending from said motor to said control valve.

* * * * *